March 18, 1969 W. L. CARTER 3,433,406
CALORIE-GRAM INDICATOR AND ALARM
Filed April 25, 1966 Sheet 1 of 2

WILLIAM L. CARTER
INVENTOR.

BY
Robert K. Rhea
AGENT

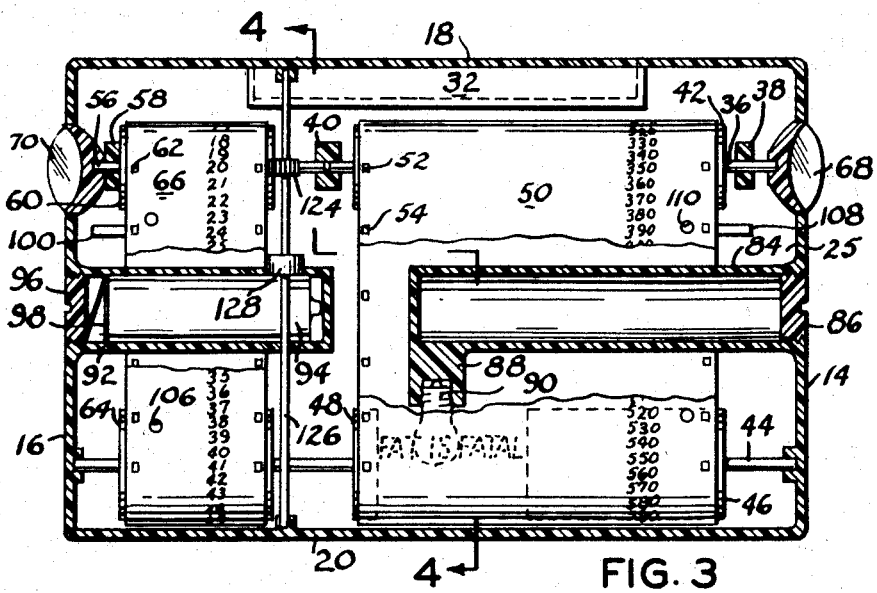

United States Patent Office 3,433,406
Patented Mar. 18, 1969

3,433,406
CALORIE-GRAM INDICATOR AND ALARM
William L. Carter, 2801 S. Air Depot,
Midwest City, Okla. 73110
Continuation-in-part of application Ser. No. 494,557,
Oct. 11, 1965. This application Apr. 25, 1966, Ser.
No. 544,949
U.S. Cl. 235—128  5 Claims
Int. Cl. G07g 3/00

The present invention is a continuation-in-part of an application filed by me in the U.S. Patent Office on Oct. 11, 1965, under Ser. No. 494,557 for Calorie and Gram Indicator, now Patent No. 3,337,128.

The present invention is an improvement over the above referred to application in that it eliminates sliding gears used in one model and provides a graphing means to be used in combination with the record of calories and grams consumed.

One of the fundamentals necessary for controlling the weight of an individual presently overweight is the accurate daily record of consumption of calories or grams. This is necessary so the individual will not damage his health by a diet too low or too high in total grams or calories per day. Furthermore, it is desirable that a record be kept of the amount of protein, fat and carbohydrates consumed to regulate the quality and quanitty of food eaten each day.

It is, therefore, the principal object of this invention to provide a device which is simple in operation for recording the total calories and total grams consumed for each meal and as a total of for the day.

A similar important object is the provision of a graph-like means which simultaneously records the consumption of carbohydrates in direct relation to the grams of food consumed.

Another object is to provide other manually operated graphing means for recording the quantity of fat and protein consumed during each meal and as a total for the day.

Still another object is to provide a visual record in total grams and calories as an aid in remembering the quality and quantity of the individual's diet each day.

Further objects are to provide a device having means for flashing a warning light and illuminating printed symbols at selected intervals as a psychological motivation to the user and having means for storing diet and other medicinal agents used for dieting purposes as well as a container for calorie, gram, fat, protein and carbohydrate food value charts.

The present invention accomplishes these and other objects by providing a housing having manually controlled axles therein and drums journaled by the axles having numerically marked bands entrained therearound visible through apertures in a front wall of the housing. Means are provided for actuating a graph and flashing a warning signal at predetermined times.

Other objects will be apparent from the following description when taken in conjunction with the accompanying two sheets of drawings, wherein:

FIGURE 3 is a vertical cross-sectional view taken substantially along the line 3—3 of FIG. 2;

FIGURE 4 is a vertical cross-sectional view taken substantially along the line 4—4 of FIG. 3;

Figure 1:
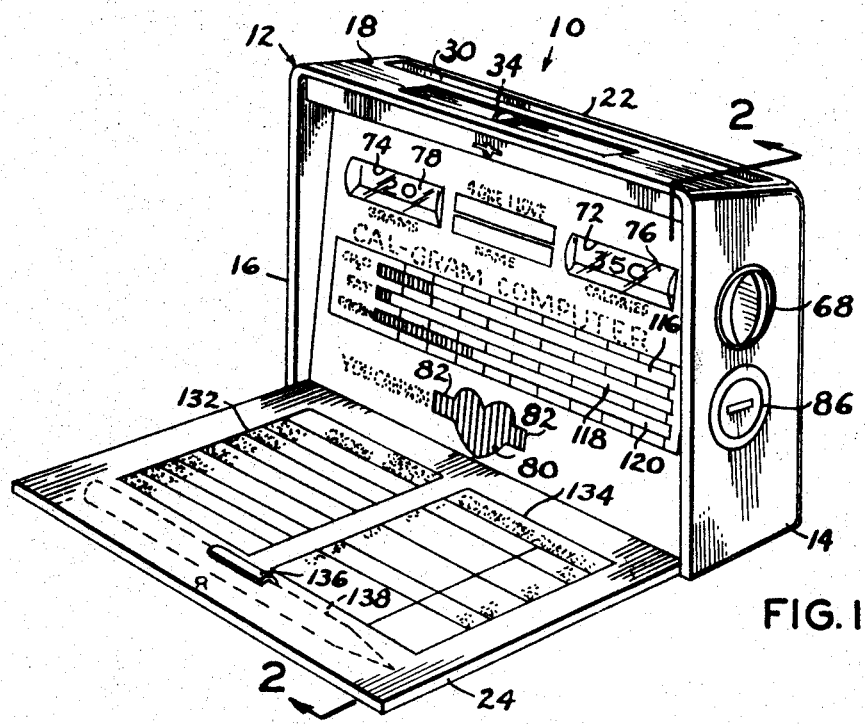
FIGURE 1 is a perspective view of the device in operative position.
Figure 2:
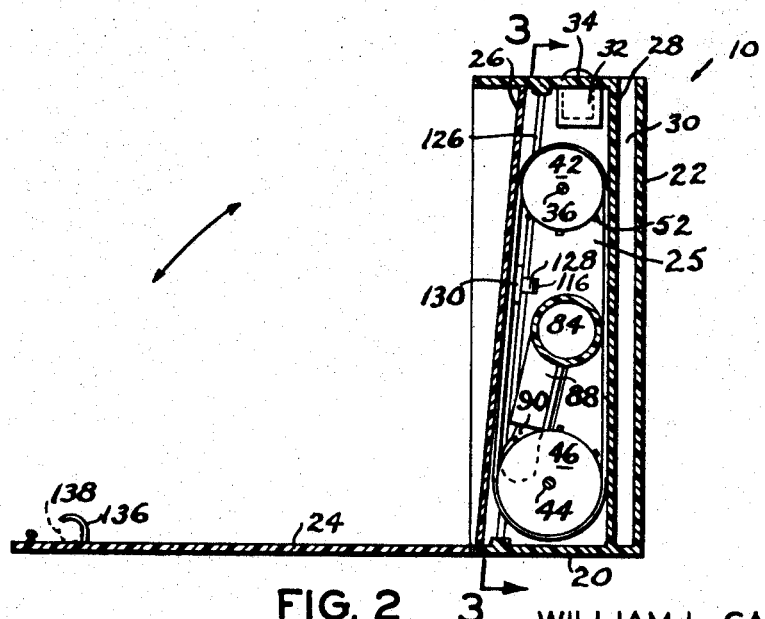
FIGURE 2 is a vertical cross-sectional view taken substantially along the line 2—2 of FIG. 1.

FIGURES 5, 6 and 7 are horizontal cross-sectional views taken substantially along the respective lines 5—5, 6—6 and 7—7 of FIG. 4; and FIGURE 8 is a wiring diagram.

Like characters of reference designate like parts in those figures of the drawings in which they occur.

In the drawings the reference numeral 10 indicates the device, as a whole, which is rectangular in general configuration. The device 10 includes a housing 12 having opposing end walls 14 and 16, top and bottom walls 18 and 20 joined to a back wall 22. A closure member 24, hingedly connected by its ends adjacent one side between the end walls 14 and 16, forms a front wall or cover for the housing. A partition wall 26, closely received at its marginal edges by the end walls, top and bottom walls and angularly disposed inwardly from the plane formed by the cover 24, forms a front panel or partition defining the forward limit of a compartment 25 for receiving the components more fully described hereinbelow.

A rearward partition wall 28, parallel with respect to the back wall 22 and joined to the respective side, top and bottom walls, forms an upwardly open pamphlet containing compartment 30 and defines the rearward limit of the compartment 25. A rectangular-shaped container 32 is integrally joined in depending relation to the inner surface of the top 18. The container 32 opens upwardly and is closed by a sliding panel 34.

An axle 36, journaled at its respective end portions by supports 38 and 40, extends longitudinally of the housing through the upper portion of the compartment 25. A cylindrical-like drum 42 surrounds and is connected with the axle 36 intermediate its ends. The length of the drum is such that it extends inwardly of the compartment 25 from a point adjacent the end wall 14 to a point beyond the vertical center portion of the housing 12 for the purposes presently apparent.

An idling shaft or axle 44 is mounted longitudinally of the housing within the lower portion of the compartment 25 and is journaled at its repsective ends by the end walls 14 and 16 parallel with respect to the bottom wall 20. A first idling roller 46 rotatably surrounds the shaft 44 with one end of the roller 46 in face to face alignment with the drum 42. The length of the roller 46 is substantially less than the length of the drum 42. A second idling roller 48 is similarly mounted on the shaft 44 with one end face aligned with the innermost end of the drum 42. Thus the innermost ends of the rollers 46 and 48 terminate in parallel spaced-apart relation at the central portion of the housing for the purposes presently apparent.

An endless band 50, having a width substantially equal with respect to the length of the drum 42, is entrained around the drum 42 and rollers 46 and 48. The drum 42 is provided at its respective end portions with outstanding circumferentially spaced-apart projections or teeth 52, which are cooperatingly received by similarly spaced-apart apertures or openings 54 formed adjacent the marginal edges of the band 50.

Similarly a second driving axle 56 is positioned within the housing compartment 25 in longitudinal alignment with the first axle 36 and is supported at one end by the support 40 and a similar support 58 at its other end. A cylindrical-like driving drum 60 is connected to the second axle 56 intermediate its ends. An idling roller 64 is mounted on the shaft 44 in cooperative alignment with the drum 60. The drum 60 is similarly provided with circumferentially spaced teeth 62 for moving an endless band 66 entrained around the drums 60 and 64. Control knobs 68 and 70, connected with the respective axles 36 and 56, project outwardly through suitable apertures formed in the respective end walls 14 and 16 for rotating the drums 42 and 60 and the respective bands 50 and 66 entrained therearound.

The marginal edge portion of the band 50 adjacent the end wall 14, is provided with a progression series of numerals, in values of ten indicating calories consumed, for example from zero to 1,000. Similarly the band 66 is circumferentially provided with a progression series of numerals indicating grams of food consumed from 1 to 100. The housing wall 26 is provided with apertures 72 and 74 through which the calories and grams, respectively, may be viewed as the respective band 50 and 66 is rotated. The apertures 72 and 74 are preferably covered with magnifying lens 76 and 78 to enlarge the size of the numerals viewed through the respective aperture. A heart shaped aperture 80 is formed through the central portion of the housing partition 26 adjacent the depending edge thereof. The heart shaped aperture 80 is characterized by laterally projecting rectangular portions 82 and is covered by preferably red colored transparent material such as cellophane.

A series of slogans is printed transversely of the band 50 and in circumferentially spaced relation at its innermost portion so that the slogans may be progressively viewed through the heart shaped aperture 80 as the band 50 is rotated. A cylindrical receptacle 84 is connected with and extends inwardly of the housing wall 14 between the drum 42 and roller 46. The outer end of the receptacle is closed by a removable cap or cover 86. A bulb holding projection 88 is formed on the inward end of the receptacle 84 for removably receiving a flash-light bulb 90 positioned between the rollers 46 and 48 and inwardly of the heart shaped opening 80. Similarly a battery holding receptacle 92 is connected with and extends inwardly of the housing wall 16 for receiving a battery 94. A cap 96, equipped with a spring 98, maintains the battery within the receptacle 92 in electrical contact with wiring and switches connected with the bulb 90.

Referring more particularly to FIGS. 7 and 8, an electrical switch 100 is mounted on the inner surface of the partition wall 28. The switch includes a pair of contacts 102 and 104 which are normally separated by the band 64 interposed therebetween. The band 64 is provided with a series of circumferentially spaced-apart openings or apertures 106 so that when one of the apertures 106 is positioned between the switch contacts 102 and 104 the lamp 90 is energized. Similarly a second switch 108 is mounted on the partition wall 28 in connection with the band 50 for energizing the lamp by apertures 110 similarly formed in circumferentially spaced relation in the band 50. The switches 100 and 108 are connected in parallel and in turn connected in series with the lamp 90 and battery 94 by wires 112 and 114 so that when either of the switches 100 or 108 are closed the lamp 90 is energized to illuminate one of the slogans on the band 50 which may be viewed through the heart shaped opening 80.

The central portion of the wall 26 is longitudinally provided with three elongated endless relatively narrow bands 116, 118 and 120 in parallel spaced-apart relation. Each of the bands has a section thereof formed of colored material so that each of the bands 116, 118 and 120 form a graph in combination with lines scored on the partition wall 26 to indicate a selected plurality of values. The band 116 indicates carbohydrates, the band 118 indicates fat while the band 120 indicates protein. The bands 118 and 120 must be moved manually. The band 116 is moved in combination with the travel of the endless band 66. This is accomplished by mounting a worm driving gear 122 on the axle 56 which meshes with a worm driven gear 124 mounted on a shaft 126 (FIGS. 4 and 5). The shaft 126 extends between and is journaled at its respective ends by the top 18 and bottom 20 adjacent the inner surface of the wall 26. As shown more clearly in FIG. 6, the band 116, inwardly of the partition 26, is entrained around a friction roller 128 mounted on the shaft 126. The band 116 is maintained in driving contact with the friction roller 128 by a pair of idling rollers 130. Thus as the axle 56 is manually rotated the worm gears 122 and 124 rotate the shaft 126 to drive the friction roller 128 and move the carbohydrate band or graph 116 in direct relation to the value of grams appearing on the band 66 when viewed through the aperture 74.

The inner surface of the housing cover 24 is provided with scored lines 132 and 134 forming score boards for recording data pertinent to the individual user of the device such as a record of daily totals of calories and grams consumed per day, the user's ideal weight, and amount of calories and grams needed to maintain the ideal weight. A spring clip 136, secured to the inner surface of the cover, holds a pencil or other writing instrument 138.

*Operation*

The device is assembled as described hereinabove and the bands 50 and 66 are positioned for the start of each day so that the numeral zero appears in the apertures 72 and 74 and the graph forming bands are positioned so that their colored portion is adjacent but not visible at the beginning end of the graph line. The user counts the calories of the meal to be eaten and rotates the control knob 68 until the proper number of calories appears in the aperture 72. While rotating the knob 68 and band 50 slogans printed on the band are intermittently visible through the heart shaped aperture 80. When reaching the total allowable calories for that meal, for example 350, one of the apertures 110 is positioned between the contacts of the switch 108 completing a circuit to and exciting the lamp 90 so that the slogan, then positioned adjacent the heart shaped opening 80, is illuminated as a warning that the total allowable calories for one meal has been reached.

Similarly the total grams of the meal to be eaten, for example twenty, is registered within the aperture 74 by rotating the control knob 70 which rotates the band 66. As the control knob 70 rotates the axle 56, the worm gears 122 and 124 drive the friction roller 128 and progressively move the carbohydrate value band 116 so that the colored portion of the band registers a value of 20 on the graph in combination with the 20 grams appearing in the aperture 74. The value of fat and protein eaten is graphed by manually moving the respective bands 118 and 120. After the total calories and grams have been recorded at the end of the day these totals are transferred to the chart 132 as a reference for a selected period of time. The fat and protein graphing bands 118 and 120 are manually returned to a starting position for the succeeding day whereas the carbohydrate band 116 must be repositioned to a starting position in combination with the endless band 66 by rotating the control knob 70. Diet pills or medicinal aids are contained by the receptacles 38 and 84 and access to the battery 94 is achieved through the cap 96. Food value charts or pamphlets are carried within the compartment 30. When the device is not in use the cover 24 is pivoted to a closed position.

I claim:
1. An indicating device, comprising: a housing having a top, bottom and end walls joined to a back wall defining an open front; a partition wall in said housing inwardly of the plane defining the open front, said partition wall having an aperture; an axle mounted within said housing in parallel relation with respect to said top wall; a second axle journaled in said end walls adjacent said bottom wall; a first drum axially connected with said first axle; at least one roller journaled on said second axle in alignment with said first drum; at least one endless band entrained around said first drum and said roller adjacent said aperture in said partition wall; means for rotating said endless band; and signal means within said housing actuated at predetermined times by the movement of said endless band.

2. Structure as specified in claim 1 in which said signal means comprises a dry cell battery, a lamp, a switch having contacts positioned on opposing sides of said endless band and normally held open by the latter, and wiring connecting said lamp with said battery through said switch, said band having a series of spaced apertures for closing said contacts thereby illuminating said lamp.

3. Structure as specified in claim 2 in which said first axle is divided intermediate its ends forming a pair of aligned axles; a second drum on the other one of said aligned axles; a second roller on said second axle; a second endless band entrained around said second drum and said second roller; and in which the means for rotating said endless band includes a control knob connected with the outermost end portion of each of said aligned axles for rotating said drums.

4. Structure as specified in claim 3 in which each of said drums is provided with circumferentially spaced teeth and said endless bands are provided with cooperating apertures spaced along the marginal edges thereof for advancing the same.

5. Structure as specified in claim 4 and an indicator band supported by said partition wall, and gear means interconnecting said aligned axles with said indicator band, said gear means comprising a shaft extending between and journaled in said top and bottom wall, a drive worm-gear on one of said aligned axles, a driven worm-gear on said shaft, and a friction roller on said shaft in contact with said indicator band.

References Cited

UNITED STATES PATENTS

| | | | |
|---|---|---|---|
| 835,844 | 11/1906 | Bewan | 235—125 |
| 1,137,427 | 4/1915 | Schaff | 58—149 |
| 1,149,516 | 8/1915 | Hirshberg | 235—71 |
| 1,953,630 | 4/1934 | Phillips | 235—125 |
| 2,804,041 | 8/1957 | Neugass | 116—135 |
| 3,024,590 | 3/1962 | Wynne. | |

RICHARD B. WILKINSON, *Primary Examiner.*

S. A. WAL, *Assistant Examiner.*

U.S. Cl. X.R.

40—86; 116—135